E. C. RICHARD.
CARBURETER.
APPLICATION FILED OCT. 18, 1915.
1,260,810.
Patented Mar. 26, 1918.
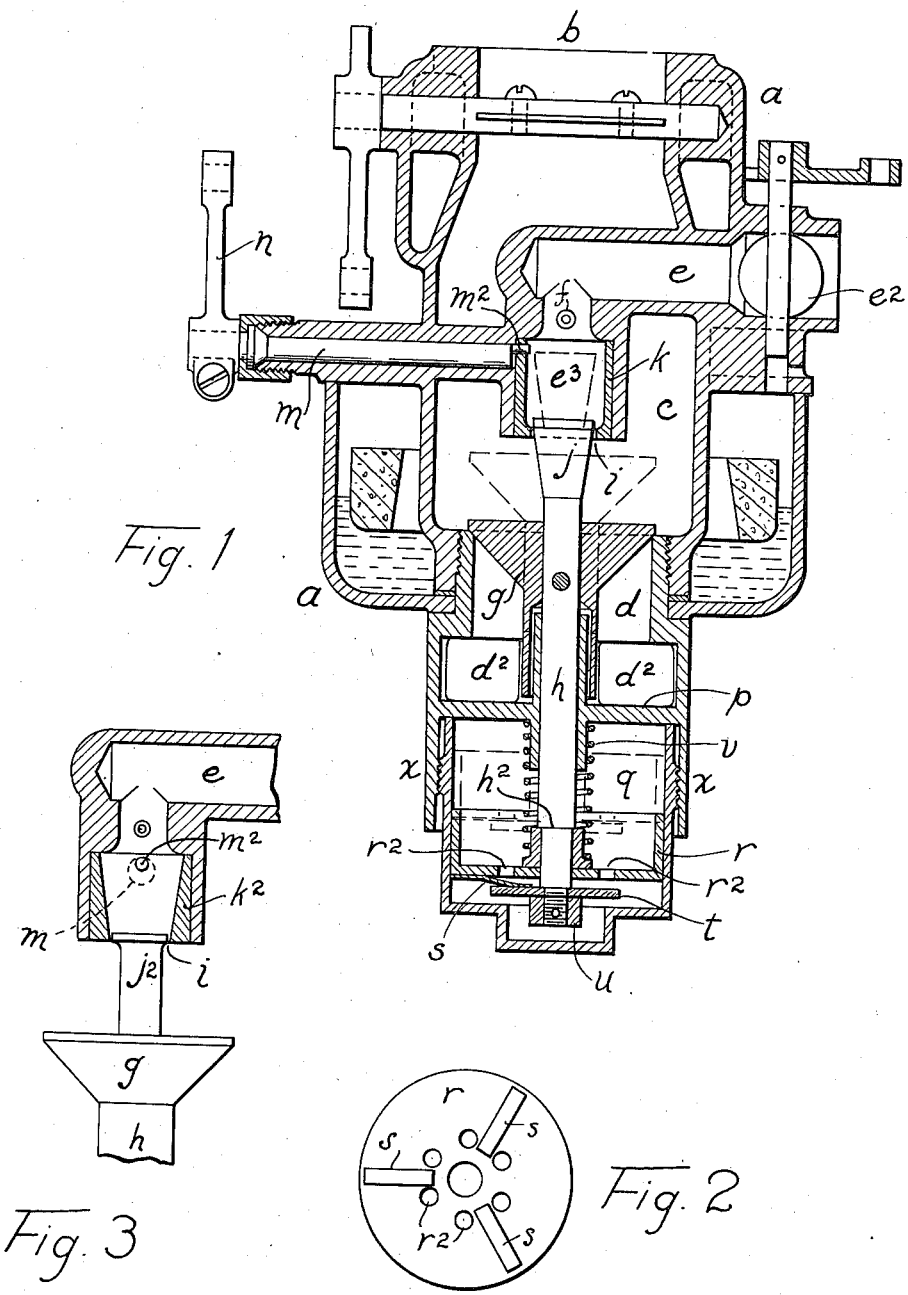
INVENTOR
Eugene C. Richard
BY Ralzemond A. Parker
ATTORNEY

UNITED STATES PATENT OFFICE.

EUGENE C. RICHARD, OF FLINT, MICHIGAN.

CARBURETER.

1,260,810.  Specification of Letters Patent.  Patented Mar. 26, 1918.

Application filed October 18, 1915. Serial No. 56,389.

*To all whom it may concern:*

Be it known that I, EUGENE C. RICHARD, a citizen of the United States, residing at Flint, county of Genesee, State of Michigan, have invented a certain new and useful Improvement in Carbureters, and declare the following to be a full, clear, and exact description of the same, such as will enable others skilled in the art to which it pertains to make and use the same, reference being had to the accompanying drawings, which form a part of this specification.

My invention relates to carbureters and an object of my improvements is to provide an improved carbureter of which the rate of feed may be manually controlled from the driver's seat and one which adjusts itself readily to different engine speeds and conditions of operation. I attain this object in the device illustrated in the accompanying drawings in which:—

Figure 1, is a central vertical section of a carbureter involving my invention.

Fig. 2, is a detail plan view.

Fig. 3, is a detail sectional elevation showing a modified form of construction.

$a$, indicates the casing as a whole. $b$ is the opening which communicates with the intake of the engine. $c$ is the mixing chamber; $d$ is a passage communicating with the outer air through the apertures $d^2$, $d^2$ and with the mixing chamber $c$. $e$ is a primary passage for air opening into the mixing chamber $c$ at $i$ axially in line with the passage $d$. $f$ is a nozzle for delivering gasolene into the pipe $e$. The nozzle $f$ may be supplied with gasolene in any usual way and is operated in the usual way by the suction in the passage $e$. $g$ is an automatic valve controlling the opening from the passage $d$ to the mixing chamber $c$. $h$ is the stem of the valve $g$. This stem extends upward into the opening from the passage $e$ and is so formed at $j$ that as the valve $g$ rises the opening from the passage $e$ will thereby be enlarged.

This construction is shown and claimed in my application Serial Number 755,310 filed March 13, 1913.

$k$ is a cylindrical sleeve fitting into the passage $e$ at $e^3$ within the mixing chamber $c$. The lower end of this sleeve is open and surrounds the part $j$ of the valve stem $h$ to form the opening $i$ from the passage $e$ into said mixing chamber. $m$ is a rod extending at right angles to the sleeve $k$ and having an eccentric pin $m^2$ engaging in an opening in said sleeve. $n$ is a lever arm on the outer end of the arm $m$ which arm may be actuated from the driver's seat by conventional means to rotate the rod $m$. The rotation of the rod $m$ moves the sleeve $k$ in the direction of its axis and adjusts the annular opening between the open lower end of said sleeve and the part $j$ of the valve stem $h$.

$x$ is an inclosed chamber at the lower end of the carbureter. The valve stem $h$ extends through a partition $p$ forming the upper wall of said chamber. $r$ is a piston in the shape of a cup adapted to reciprocate in the chamber $x$. $r^2$, $r^2$ are apertures formed through the web of the piston $r$ in a circle concentric with said piston. The piston $r$ fits and is adapted to slide longitudinally upon the lower end of the valve stem $h$. $h^2$ is a shoulder adapted to limit the travel of the piston $r$ toward the valve $g$. $v$ is a spring bearing against the partition $p$ and pressing downward upon the piston $r$. $t$ is a circular disk secured upon the lower end of the valve stem $h$ and beneath the apertures $r^2$ in the piston $r$. $s$ is a leaf spring pressing upon the disk $t$ to force the same downward. $u$ is a nut for securing the disk $t$ in place upon the valve stem $h$.

A liquid, such as glycerin, is placed in the chamber and the piston $r$ moves in said fluid so as to secure a dash-pot action.

$e^2$ is a valve by which the opening into the passage $e$ may be regulated.

The operation of the above-described device is as follows:

The suction of the engine acts to raise the valve $g$ and draw air through the passage $d$. The lifting of the valve $g$ raises the valve stem $h$ and increases the annular opening from the passage $e$ around the portion $j$ of said stem. Liquid fuel is supplied through a nozzle $f$ in the passage $e$ and air is drawn through said passage carrying the liquid fuel with it and mixing with the air drawn from the passage $d$.

As described in my application above referred to, the apparatus just described will vary the feed of fuel to correspond to the variation in speed of the engine, but should it be desired to either increase or diminish the rate at which the fuel is supplied under all of the various speeds and conditions of the engine, the rod $m$ will be rotated to adjust the sleeve $k$ in the direction of its axis. It will be seen that this operation will leave the proportionality of the supply at different speeds subject to the same condition, but will increase or diminish the rate at which the fuel is supplied under all of the conditions.

When the valve $g$ is raised from its seat it moves a very short distance without moving the piston $r$. This short movement brings the disk $t$ close up against the web of the piston $r$ and nearly closes the passage through the apertures $r^2$. Further lift of the valve $g$ raises the piston $r$ and this it must do slowly because the glycerin, or other suitable fluid, must move from above the piston $r$ to below said piston through the apertures $r^2$, $r^2$ and with these apertures constricted the motion of the fluid must necessarily be slow.

When the engine stops the valve $g$ drops and the disk $t$ is, with the first movement of the valve $g$, carried away from the piston $r$ leaving the apertures $r^2$ fully open so that the valve $g$ is free to fall rapidly.

In the modification of Fig. 3, instead of the upper end of the valve stem $h$ being made flaring, as shown in Fig. 1, to adapt it to vary the opening from the passage $e$, the sleeve $k$ is formed with a flaring aperture and the upper end of the valve stem $h$ is formed as indicated at $j^2$ so that the opening from the passage $e$ will be varied in the same way by the motion of the valve $g$.

What I claim is:

1. In a carbureter, the combination of an air passage, an automatic valve adapted to be moved from its seat by the air passing through said passage and in so doing to adjust the opening from said passage, a second air passage opening into said carbureter, means whereby the motion of said valve shall vary the area of opening from said second passage in proportion to the extent of movement of said valve, means for adjusting at will the initial opening from said second passage and a delivery passage for liquid fuel opening into said second passage.

2. In a carbureter, the combination of an intake passage, an automatic valve adapted to regulate the opening from said passage, a second passage opening into said carbureter, a projection from said valve extending into the opening from said second passage and adapted to vary the area thereof by the movement of said valve, a sleeve adapted to move axially in said second passage, the opening from said sleeve constituting the opening from said second passage, and means for adjusting said sleeve axially to vary the opening from said second passage.

3. In a carbureter, the combination of an intake passage, an automatic valve adapted to control the opening from said intake passage, a dash-pot having a piston therein provided with an aperture therethrough, said valve having a stem extending through said piston and having a limited motion relative thereto, and a disk secured to said stem below said piston and adapted to close said aperture when drawn toward said piston by the raising of the valve, and a spring tending to force said piston and said disk apart.

4. In a carbureter, the combination of an intake passage, a valve adapted to control the opening from said passage, a stem extending from said valve, said stem extending into an inclosed chamber, a piston adapted to reciprocate in said chamber and having apertures therethrough, said piston being adapted to permit a slight movement of said stem relative to said piston, and a disk $t$ upon said stem adapted to vary the area of passage through said apertures, substantially as shown and for the purposes described.

In testimony whereof, I sign this specification.

EUGENE C. RICHARD.

Witnesses:
CLARA Z. BUELL,
ELMA E. EASTON.